US011732783B2

(12) United States Patent
Namie et al.

(10) Patent No.: US 11,732,783 B2
(45) Date of Patent: Aug. 22, 2023

(54) CHAIN GUIDE

(71) Applicant: TSUBAKIMOTO CHAIN CO., Osaka (JP)

(72) Inventors: Tsutomu Namie, Osaka (JP); Takahiro Matsushita, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 21 days.

(21) Appl. No.: 17/487,125

(22) Filed: Sep. 28, 2021

(65) Prior Publication Data

US 2022/0099164 A1 Mar. 31, 2022

(30) Foreign Application Priority Data

Sep. 29, 2020 (JP) ................. 2020-163522

(51) Int. Cl.
*F16H 7/08* (2006.01)
*F16H 7/18* (2006.01)

(52) U.S. Cl.
CPC ................. *F16H 7/08* (2013.01); *F16H 7/18* (2013.01); *F16H 2007/0872* (2013.01); *F16H 2007/0893* (2013.01); *F16H 2007/185* (2013.01)

(58) Field of Classification Search
CPC ...... F16H 7/06; F16H 7/08; F16H 2007/0863; F16H 2007/0872; F16H 7/18; F16H 2007/185; F16H 2007/0893; F02B 67/04; F02B 67/06

See application file for complete search history.

(56) References Cited

U.S. PATENT DOCUMENTS

| | | | | |
|---|---|---|---|---|
| 5,184,983 | A * | 2/1993 | Shimaya | F16H 7/08 474/140 |
| 5,820,502 | A * | 10/1998 | Schulze | F16H 7/08 474/140 |
| 6,612,952 | B1 * | 9/2003 | Simpson | F16H 7/08 474/140 |
| 7,967,708 | B2 * | 6/2011 | Hayami | F16H 7/18 474/140 |
| 9,534,671 | B2 * | 1/2017 | Ishikawa | F16H 7/18 |

(Continued)

FOREIGN PATENT DOCUMENTS

| DE | 102009012713 A1 * | 9/2010 | ............... F01L 1/02 |
|---|---|---|---|
| EP | 0553474 A1 * | 8/1993 | ..... F16H 2007/0872 |

(Continued)

*Primary Examiner* — Michael R Mansen
*Assistant Examiner* — Raveen J Dias
(74) *Attorney, Agent, or Firm* — WHDA, LLP

(57) ABSTRACT

An object of the present invention is to provide a chain guide that can reduce vibration and noise while maintaining necessary strength, rigidity, and durability. The chain guide has a support wall extending forward from a boss part, which constitutes a circumferential wall of a pivot shaft, along a plane perpendicular to a pivot axis line. The support wall includes a base part that is provided with a running surface-side rib, and a connecting portion with a cross-sectional area thereof reducing toward the boss part. The running surface-side rib is not in contact with the boss part. The chain guide does not include a connecting portion that has a larger width than the thickness of the support wall and extends in a pivoting direction on a back side of the running surface-side rib in a region at a pivot shaft side end thereof.

8 Claims, 6 Drawing Sheets

(56) References Cited

U.S. PATENT DOCUMENTS

| | | | |
|---|---|---|---|
| 11,248,682 B2* | 2/2022 | Hashimoto | F16H 7/18 |
| 2006/0205548 A1* | 9/2006 | Konno | F16H 7/18 |
| | | | 474/140 |
| 2008/0254926 A1* | 10/2008 | Schuseil | F16H 7/18 |
| | | | 474/111 |
| 2009/0029814 A1* | 1/2009 | Schuseil | F16H 7/18 |
| | | | 474/111 |
| 2009/0036242 A1* | 2/2009 | Hayami | F16H 7/18 |
| | | | 474/111 |
| 2014/0243132 A1* | 8/2014 | Kurematsu | F16H 7/18 |
| | | | 474/140 |
| 2015/0219190 A1* | 8/2015 | Geibel | F16H 7/08 |
| | | | 474/111 |
| 2016/0116030 A1* | 4/2016 | Cowen | F16H 7/08 |
| | | | 474/111 |
| 2016/0312863 A1* | 10/2016 | Simmons | F16H 7/08 |
| 2017/0009849 A1* | 1/2017 | Stiglmaier | F16H 7/08 |
| 2020/0256434 A1* | 8/2020 | Kurematsu | F16H 7/18 |
| 2020/0362944 A1* | 11/2020 | Hashimoto | F16H 7/18 |

FOREIGN PATENT DOCUMENTS

| | | | | |
|---|---|---|---|---|
| JP | H08200458 A | | 8/1996 | |
| JP | 2002098203 A | * | 4/2002 | F16H 2007/0872 |
| JP | 3448122 B2 | | 9/2003 | |
| JP | 2006250208 A | | 9/2006 | |

* cited by examiner

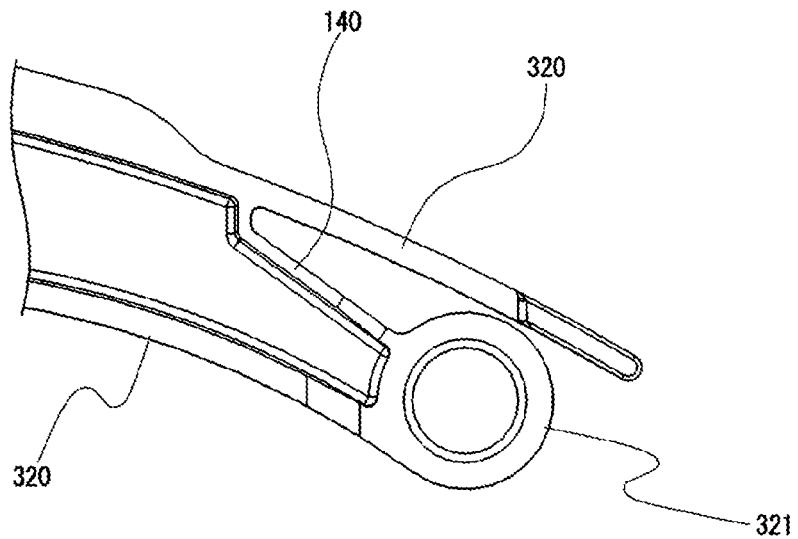

CHAIN GUIDE

BACKGROUND OF THE INVENTION

1. Field of the Invention

The present invention relates to a chain guide having a guide shoe that slidably guides a running chain, and a guide body configured to be pivotable around a pivot shaft to support the guide shoe.

2. Description of the Related Art

A chain guide incorporated in a timing system in the engine room of an automobile for slidably guiding a running chain to keep tension appropriately between sprockets is known.

One type of chain guides has a guide shoe that slidably guides a running chain, and a guide body configured to be pivotable around a pivot shaft to support the guide shoe (see, for example, Japanese Patent No. 3448122 and Japanese Patent Application Publication No. 2006-250208).

Generally, the guide member of a chain guide is provided with ribs for enhancing the rigidity of the guide body, in order to meet requirements in terms of certain levels of strength, rigidity, and durability to stably guide the chain against the tension or vibration of the chain.

For example, the guide bodies of the chain guides described in Japanese Patent No. 3448122 and Japanese Patent Application Publication No. 2006-250208 each have a support wall extending forward from a boss part that forms a circumferential wall of a pivot shaft along a plane perpendicular to the pivot axis line, with the support wall being provided, at each of upper and lower ends thereof, with a rib that protrudes in a direction perpendicular to the support wall so that the cross-sectional shape is substantially in the form of letter I.

SUMMARY OF THE INVENTION

However, conventional chain guides have an issue that noise and vibration of the guide body, which are caused by the running chain, are easily transmitted to the engine and the like and this leads to increased noise and vibration of the entire engine or the like.

The inventors of the present application focused on the configuration of conventional chain guides in which a high-rigidity part is present in the portion extending from the chain running surface to the boss part, and identified this as the cause of the issue. Namely, in the chain guide described in Japanese Patent No. 3448122, the guide body has a running surface-side rib connected to the boss part by a connecting part with a larger width than the thickness of the support wall. In the chain guide described in Japanese Patent Application Publication No. 2006-250208, while the running surface-side rib of the guide body is not directly connected to the boss part, the running surface-side rib is connected to a back side rib by a connecting part having a larger width than the thickness of the support wall and extending in the pivoting direction, in the joint part between the support wall and the boss part.

The inventors considered that the presence of a portion having a high rigidity against a force that acts in the pivoting direction, when the chain enters, in the part extending from the chain running surface to the boss part, facilitates transmission of vibration caused by entrance of the chain (codal action) from the chain running surface to the engine block via the pivot shaft. The present invention has been thus completed by devising a configuration that avoids such a structure.

An object of the present invention is to provide a chain guide that can reduce vibration and noise while maintaining necessary strength, rigidity, and durability.

The present invention solves the above problem by providing a chain guide comprising: a guide shoe that slidably guides a running chain; and a guide body configured to be pivotable around a pivot shaft and supporting the guide shoe, the guide body including a boss part constituting a circumferential wall of the pivot shaft, a support wall extending forward from the boss part along a plane perpendicular to a pivot axis line, and a running surface-side rib provided along an upper edge of the support wall so as to be in contact with the guide shoe. The support wall includes a base part, which is provided with the running surface-side rib and has an upper surface curved in a circular arc, and a connecting portion connecting the base part and the boss part and not provided with the running surface-side rib. The connecting portion has an upper surface continuous with an upper surface of the base part via a step and a lower surface smoothly continued with a lower surface of the base part, with a cross-sectional area thereof reducing toward the boss part. The running surface-side rib is not in contact with the boss part. The guide body does not have a connecting part, which has a larger width than a thickness of the support wall and extends in a pivoting direction, on a back side of the running surface-side rib in a region at a pivot shaft side end thereof.

According to the chain guide set forth in claim 1, the running surface-side rib is not in contact with the boss part, and there is no connecting part having a larger width than the thickness of the support wall and extending in the pivoting direction. Therefore, direct vibration transmission from the chain running surface to the boss part is blocked, and transmission of vibration from the chain running surface to the boss part through a constituent part having a high rigidity is suppressed, because the rigidity against a force that acts in the pivoting direction, when the chain enters, is lowered at the end on the chain entrance side. Accordingly, vibration caused by entrance of the chain is prevented from being largely transmitted from the pivot shaft to the engine block, and this leads to reduced vibration and noise.

The connecting portion has an upper surface continuous with the upper surface of the base part provided with the running surface-side rib via a step, whereby a space is formed between the chain running surface and the boss part. Hence, since there is no high-rigidity constituent part that may form a vibration transmission path, and since this space can absorb vibration, vibration and noise can be reduced in this respect, too.

According to the configuration set forth in claim 2, the connecting portion has, at an upper end thereof, a side face rib plate, provided so as to protrude in a direction perpendicular to the support wall and to connect the running surface-side rib and the boss part. This way, rigidity against flexion and torsion can be enhanced without forming a high-rigidity portion that may form a vibration transmission path extending from the chain running surface to the boss part.

According to the configuration set forth in claim 3, the connecting portion has, on an upper surface thereof, an upper face rib plate having a thickness equal to or less than that of the base part and provided so as to extend along a plane perpendicular to the pivot axis line. The upper face rib plate can further increase the rigidity of a part that requires reinforcement.

According to the configuration set forth in claim 4, the upper face rib plate is connected to an outer circumferential surface of the boss part only at a position further forward in a chain running direction than a vertical line from a center of the pivot shaft relative to a chain running line, and connected to a lower surface of the running surface-side rib at a position further forward than the vertical line. This means that the space formed from the chain running surface to the boss part is not taken up, hence the vibration absorbing effect is hardly compromised. Thus vibration transmission from the chain running surface to the boss part can reliably be suppressed while necessary rigidity is maintained.

According to the configuration set forth in claim 5, the upper face rib plate has an upper surface connected to a back side of the running surface-side rib at an acute angle. This enables the space formed from the chain running surface to the boss part to be as large as possible, which ensures the vibration absorbing effect.

According to the configuration set forth in claim 6, the guide shoe has a pivot shaft side end located further forward in the chain running direction than the vertical line from the center of the pivot shaft relative to a chain running line. This reliably suppresses transmission of vibration from the chain running surface to the boss part, and prevents impact noise or vibration noise resulting from flapping of the chain at the chain entrance-side end.

According to the configuration set forth in claim 7, the running surface-side rib has a pivot shaft side end located further forward in the chain running direction than the boss part. This means that, in the part extending from the chain running surface to the boss part, the upper face rib plate is the only member that is joined to the outer circumferential surface of the boss part, or that, a space is formed between the back side of the running surface-side rib in the region at the pivot shaft side end and the outer circumferential surface of the boss part. This further ensures the expected vibration absorbing effect.

According to the configuration set forth in claim 8, the pivot shaft side end of the guide shoe is located further forward in the chain running direction than the boss part, and further backward than the pivot shaft side end of the running surface-side rib. Therefore, in addition to the expected vibration dampening effect, the effect of preventing impact noise or vibration noise resulting from flapping of the chain at the chain entrance-side end can be achieved more reliably.

BRIEF DESCRIPTION OF THE DRAWINGS

FIG. 10 is an enlarged front view illustrating the configuration of a pivot shaft side end of the guide body of the chain guide shown in FIG. 9.

DESCRIPTION OF THE PREFERRED EMBODIMENTS

A chain guide according to the present invention will be hereinafter described with reference to the drawings.

Figure 1:
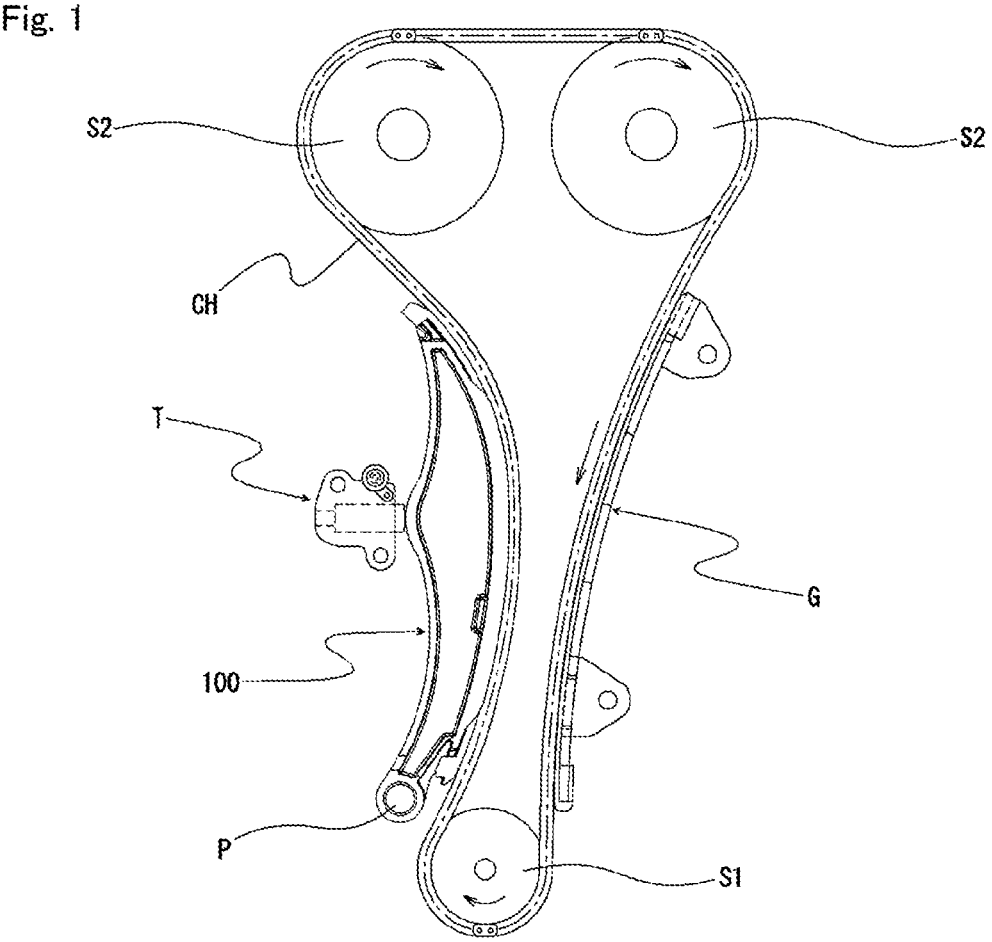
FIG. 1 is a diagram illustrating one example of a manner of use of a chain guide according to the present invention.

As illustrated in FIG. 1, the chain guide 100 according to a first embodiment of the present invention is incorporated in a timing system of a car engine, in which a chain CH that transmits power is passed over a drive-side sprocket S1 attached to a crankshaft and two driven-side sprockets S2 each attached to each of two camshafts.

The chain guide 100 is pivotably mounted on a pivot shaft P protruding from an attachment surface (not shown) of an engine block (not shown). The chain guide 100 is pressed by a tensioner T against the chain CH and used as a pivoting guide that keeps correct tension of the chain CH while slidably guiding the chain CH. Reference numeral G in FIG. 1 denotes a fixed guide that guides the running chain CH in sliding contact therewith.

Figure 2:
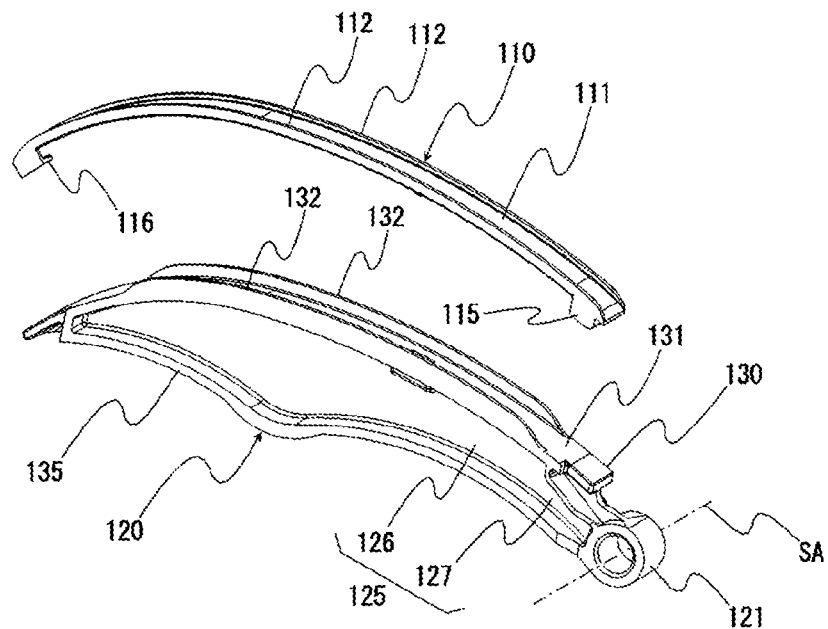
FIG. 2 is an exploded perspective view illustrating a configuration example of the chain guide according to a first embodiment of the present invention.
Figure 3:
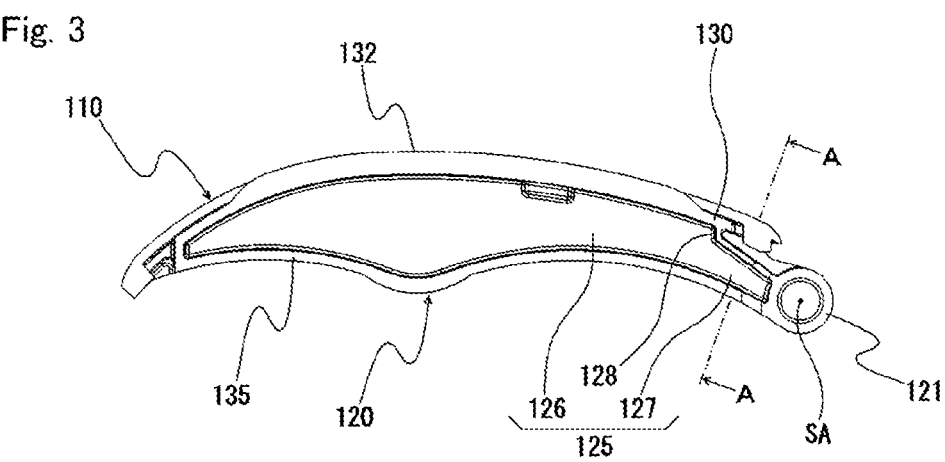
FIG. 3 is a front view of the chain guide shown in FIG. 2.

The chain guide 100 has a guide shoe 110 slidably guiding the running chain CH, and a guide body 120 attached to the guide shoe 110 and supporting the guide shoe 110 along a running direction of the chain (chain running direction), as illustrated in FIG. 2 to FIG. 3.

The guide shoe 110 has a chain running surface 111 curved and extending along the chain running direction, and guide wall parts 112 formed on both sides in the width direction of the chain running surface 111.

On either end in the chain running direction are provided a chain entrance-side engaging portion 115, to engage with one side of a running surface-side rib 130 of the guide body 120, and a chain exit-side engaging portion 116.

The guide body 120 includes a cylindrical boss part 121 at one end on the chain entrance side, which forms a circumferential wall for the pivot shaft P, so that the guide body can pivot around the pivot shaft P.

A support wall 125 continuously extends forward from an outer circumferential surface of the boss part 121 in the chain running direction along a plane perpendicular to the pivot axis line SA.

The support wall 125 includes a base part 126 having an upper surface curved in a circular arc, and a connecting portion 127 connecting the base part 126 and the boss part 121.

The connecting portion 127 has an upper surface continuous with the upper surface of the base part 126 via a step 128, and a lower surface smoothly continued with the lower surface of the base part 126, and is formed such that its cross-sectional area reduces toward the boss part 121. This way, a space is formed in the portion between the chain running surface 111 and the boss part 121, which means there is no constituent part that can form a vibration transmission path. This space can also absorb vibration, so that vibration and noise caused by entrance of the chain can be reduced.

The base part 126 of the support wall 125 is provided with the running surface-side rib 130 and a lower rib 135 at the upper and lower ends such as to protrude in a direction perpendicular to the base part 126 and to extend along the chain running direction, so that the cross-sectional shape is substantially in the form of letter I.

The running surface-side rib 130 is provided along the upper edge of the base part 126 in contact with the back side of the guide shoe 110. The upper surface of the base part 126 and the upper surface of the running surface-side rib 130 together form a guide shoe support surface 131. On both sides in the guide shoe width direction of the running surface-side rib 130 are provided a pair of side wall ribs 132 that restrict lateral shift of the guide shoe 110.

Figure 4:
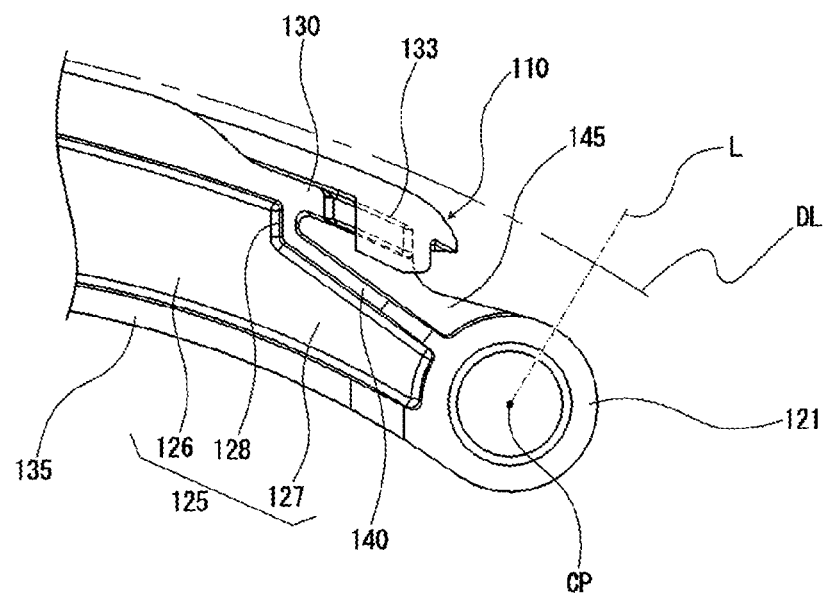
FIG. 4 is an enlarged front view illustrating the configuration of a pivot shaft side end of the chain guide shown in FIG. 2.
Figure 5:
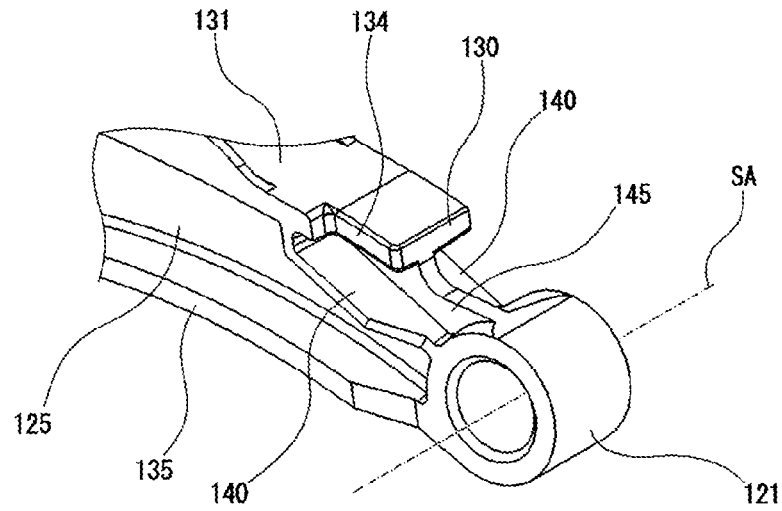
FIG. 5 is an enlarged perspective view illustrating the configuration of a pivot shaft side end of the guide body of the chain guide shown in FIG. 2 viewed from above.

As illustrated in FIG. 4 and FIG. 5, the running surface-side rib 130 has a pivot shaft-side end 133 that is located further forward in the chain running direction than a vertical line L from the center CP of the pivot shaft relative to a chain running line DL, i.e., the running surface-side rib 130 is configured such that its pivot shaft-side end 133 does not contact the boss part 121. Therefore, in the portion between the chain running surface 111 and the boss part 121, the connecting portion 127 of the support wall 125 is the only part connected to the outer circumferential surface of the boss part 121, meaning that the portion between the chain running surface 111 and the boss part 121 is left as a space. Therefore, direct vibration transmission from the chain running surface 111 to the boss part 121 when the chain enters is cut off, and the space formed in the portion between the chain running surface 111 and the boss part 121 absorbs the vibration, so that vibration and noise caused by entrance of the chain can be reduced.

In this chain guide 100, with the chain entrance-side engaging portion 115 of the guide shoe 110 engaging with an engaged portion 134 that is a notch on one side in the width direction of the pivot shaft-side end 133 of the running surface-side rib 130, the pivot shaft-side end of the guide shoe 110 is located further forward in the chain running direction than a vertical line L from the center CP of the pivot shaft relative to the chain running line DL. This configuration can reliably suppress transmission of vibration from the chain running surface 111 to the boss part 121, and prevent impact noise or vibration noise resulting from flapping of the chain CH on the chain guide 100 at the chain entrance-side end.

Since the pivot shaft-side end 133 of the running surface-side rib 130 is located further forward in the chain running direction than the boss part 121, the effect of preventing impact noise or vibration noise resulting from flapping of the chain CH on the chain guide 100 at the chain entrance-side end can be achieved more reliably, in addition to the expected vibration dampening effect.

The chain guide requires certain levels of strength, rigidity, and durability for stably guiding the chain against the tension or vibration of the chain as mentioned above. This chain guide 100 is provided with a side face rib plate 140 that connects the running surface-side rib 130 and the boss part 121.

The side face rib plate 140 is provided to the upper end of the connecting portion 127 each on the front side and the back side such as to protrude in a direction perpendicular to the support wall 125 and to extend along the chain running direction. This enhances rigidity against flexion and torsion without forming a portion having a high rigidity against a force that is applied in the pivoting direction when the chain enters, i.e., a portion that can become a vibration transmission path from the chain running surface 111 to the boss part 121.

Figure 6:
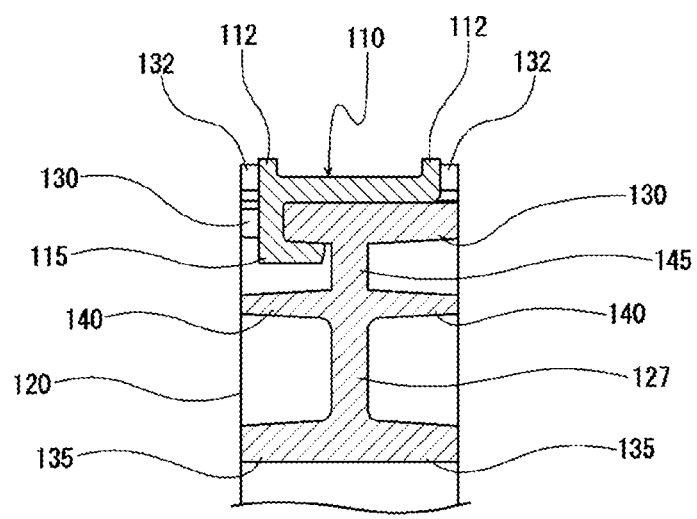
FIG. 6 is a schematic cross-sectional view illustrating the configuration of a cross section along line A-A in FIG. 3.

This chain guide 100 is further provided with an upper face rib plate 145 having the same thickness as the support wall 125, as illustrated also in FIG. 6, on the upper surface of the connecting portion 127 such as to extend along a plane perpendicular to the pivot axis line SA, which further increases the rigidity against flexion and torsion of the part that needs reinforcement. While the upper face rib plate 145 in this embodiment has the same thickness as the connecting portion 127 of the support wall 125, the thickness may be smaller than that of the connecting portion 127 of the support wall 125.

The upper face rib plate 145 itself, by having a thickness same or smaller than that of the connecting portion 127 of the support wall 125, does not form a portion having a high rigidity against a force that is applied in the pivoting direction when the chain enters. This means that the vibration dampening effect is hardly compromised.

The upper face rib plate 145 is connected to the outer circumferential surface of the boss part 121 only on the front side of a vertical line L from the center CP of the pivot shaft to the chain running line DL. This means that the space formed between the chain running surface 111 and the boss part 121 is not taken up, so that the vibration absorbing effect is hardly compromised. Thus vibration transmission from the chain running surface 111 to the boss part 121 can reliably be suppressed while necessary rigidity is maintained.

The upper surface of the upper face rib plate 145 joins the back side of the running surface-side rib 130 at an acute angle, which allows formation of a maximum possible space between the chain running surface 111 and the boss part 121 and ensures the vibration absorbing effect.

As described above, the guide body 120 of this chain guide 100 is configured without a connecting part that has a larger width than the thickness of the support wall 125 and extends in the pivoting direction on the back side of the running surface-side rib 130 in a region at a pivot shaft side end. In other words, the guide body 120 is configured to have a reduced rigidity at the chain entrance-side end relative to a force that is applied in the pivoting direction when the chain enters. This suppresses vibration transmission from the chain running surface 111 to the boss part 121 via a constituent portion with high rigidity. Accordingly, vibration caused by entrance of the chain is prevented from being transmitted largely from the pivot shaft P to the engine block, leading to reduced vibration and noise.

While one embodiment of the present invention has been described in detail, the present invention is not limited to the embodiment described above and may be carried out with various design changes without departing from the scope of the present invention set forth in the claims.

Figure 7:
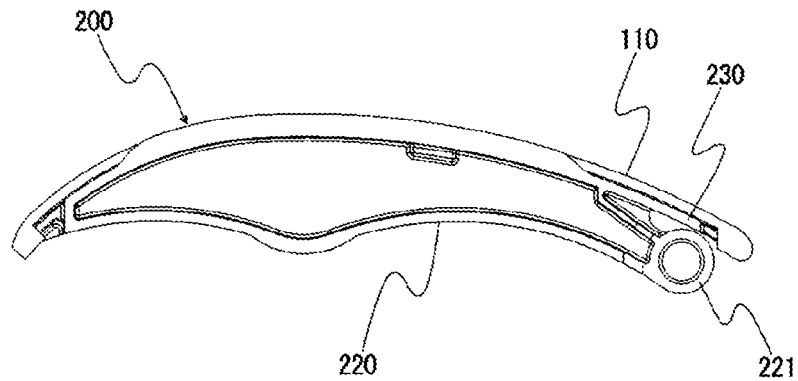
FIG. 7 is a front view illustrating a configuration example of the chain guide according to a second embodiment of the present invention.
Figure 8:
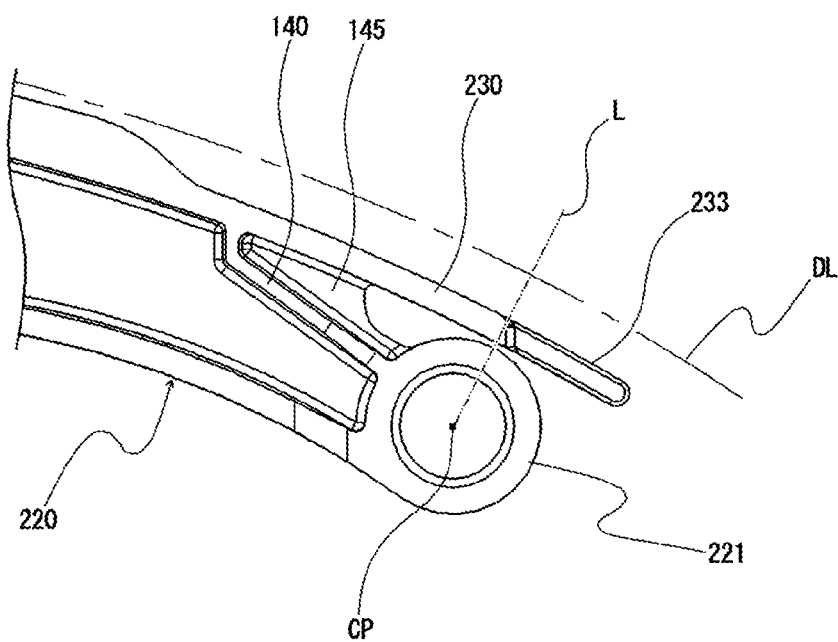
FIG. 8 is an enlarged front view illustrating the configuration of a pivot shaft side end of the guide body of the chain guide shown in FIG. 7.

For example, in the embodiment described above, the pivot shaft-side end 133 of the running surface-side rib 130 is located further forward in the chain running direction than a vertical line L from the center CP of the pivot shaft relative to the chain running line DL. As illustrated in FIG. 7 and FIG. 8, as long as the pivot shaft-side end 133 of the running surface-side rib 130 does not contact the boss part 121, the pivot shaft-side end may be located further backward in the chain running direction than the vertical line L from the center CP of the pivot shaft relative to the chain running line DL.

In this chain guide 200, the pivot shaft-side end 233 of the running surface-side rib 230 of the guide body 220 is located further backward in the chain running direction than the boss part 221. The back side of the running surface-side rib 230 in the region at the pivot shaft side end is not in contact with the outer circumferential surface of the boss part 221. Therefore, direct vibration transmission from the chain running surface 111 to the boss part 221 when the chain enters is cut off, and the space formed in the portion between the chain running surface and the boss part absorbs the vibration, so that vibration and noise when the chain enters can be reduced.

Figure 9:
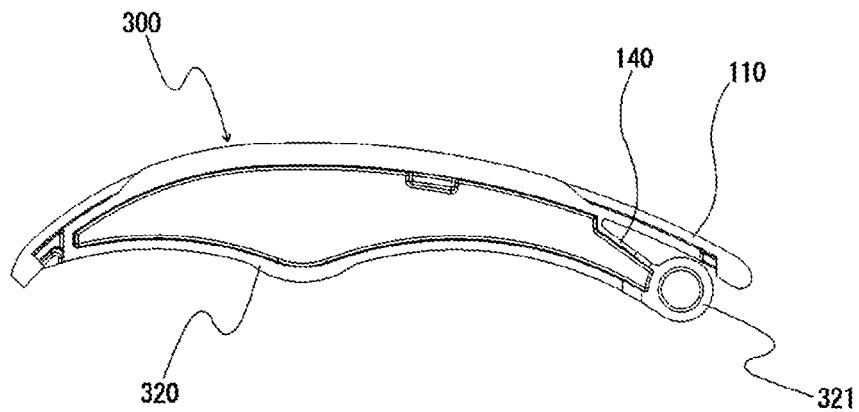
FIG. 9 is a front view illustrating a configuration example of the chain guide according to a third embodiment of the present invention.

In the embodiment described above, the guide body is provided with the upper face rib plate 145. As long as there is the side face rib plate 140, the guide body 320 need not necessarily be provided with the upper face rib plate as illustrated in FIG. 9 and FIG. 10. The chain guide 300 configured this way can reduce vibration and noise since the space formed in the portion between the chain running surface 111 and the boss part 321 absorbs vibration while the side face rib plate 140 maintains the rigidity against flexion and torsion.

While the embodiments have been described above with respect to specific examples of the chain guide according to the present invention, the chain guide of the present invention is not limited to these. Various modifications are possible in terms of shape, position, dimension, and the positional relationship of various components.

For example, the base part of the support wall of the guide body may be provided with a reinforcing rib.

The guide body and the guide shoe may be formed separately, or may be formed in one piece. When the guide body and the guide shoe are formed as separate parts, they may be attached to each other in any way. Moreover, the materials of the guide body and guide shoe may be selected from known suitable materials such as resin and metal in accordance with the rigidity, sliding characteristics, formability, cost, and so on.

What is claimed is:

1. A chain guide comprising: a guide shoe that slidably guides a running chain; and a guide body configured to be pivotable around a pivot shaft and supporting the guide shoe,
   the guide body including a boss part constituting a circumferential wall of the pivot shaft, a support wall extending forward from the boss part along a plane perpendicular to a pivot axis line, and a running surface-side rib provided along an upper edge of the support wall so as to be in contact with the guide shoe,
   the support wall including a base part which is provided with the running surface-side rib and has an upper surface curved in a circular arc, and a connecting portion connecting the base part and the boss part and not provided with the running surface-side rib,
   the connecting portion having an upper surface continuous with the upper surface of the base part via a step and a lower surface smoothly continued with a lower surface of the base part, with a cross-sectional area thereof reducing toward the boss part,
   the running surface-side rib not being in contact with the boss part, and
   the guide body not having a connecting part that has a larger width than a thickness of the support wall and extends in a pivoting direction on a back side of the running surface-side rib in a region at a pivot shaft side end of the running surface-side rib,
   wherein the connecting portion has, on the upper surface thereof, an upper face rib plate having a thickness equal to or less than that of the support wall and the upper face rib plate provided so as to extend along the plane perpendicular to the pivot axis line.

2. The chain guide according to claim 1, wherein the connecting portion has, at an upper end thereof, a side face rib plate, provided so as to protrude in a direction perpendicular to the support wall and to connect the running surface-side rib and the boss part.

3. The chain guide according to claim 1, wherein the upper face rib plate is connected to an outer circumferential surface of the boss part only at a position further forward in a chain running direction than a vertical line from a center of the pivot shaft relative to a chain running line, and connected to a lower surface of the running surface-side rib at a position further forward than the vertical line.

4. The chain guide according to claim 1, wherein the upper face rib plate has an upper surface connected to the back side of the running surface-side rib at an acute angle.

5. The chain guide according to claim 1, wherein the guide shoe has a second pivot shaft side end located further forward in a chain running direction than a vertical line from a center of the pivot shaft relative to a chain running line.

6. The chain guide according to claim 5, wherein the running surface-side rib has the pivot shaft side end located further forward in the chain running direction than the boss part.

7. The chain guide according to claim 5, wherein the second pivot shaft side end of the guide shoe is located further forward in the chain running direction than the boss part, and further backward than the pivot shaft side end of the running surface-side rib.

8. A chain guide comprising: a guide shoe that slidably guides a running chain; and a guide body configured to be pivotable around a pivot shaft and supporting the guide shoe,
   the guide body including a boss part constituting a circumferential wall of the pivot shaft, a support wall extending forward from the boss part along a plane perpendicular to a pivot axis line, and a running surface-side rib provided along an upper edge of the support wall so as to be in contact with the guide shoe,
   the support wall including a base part which is provided with the running surface-side rib and has an upper surface curved in a circular arc, and a connecting portion connecting the base part and the boss part and not provided with the running surface-side rib,
   the connecting portion having an upper surface continuous with the upper surface of the base part via a step and a lower surface smoothly continued with a lower surface of the base part, with a cross-sectional area thereof reducing toward the boss part,
   the running surface-side rib not being in contact with the boss part, and
   the guide body not having a connecting part that has a larger width than a thickness of the support wall and extends in a pivoting direction on a back side of the running surface-side rib in a region at a pivot shaft side end of the running surface-side rib,
   wherein the pivot shaft side end of the running surface-side rib is located further backward in a chain running direction than a vertical line from a center of the pivot shaft relative to a chain running line.

* * * * *